United States Patent [19]

Kommineni et al.

[11] Patent Number: 4,731,144

[45] Date of Patent: Mar. 15, 1988

[54] METHOD OF SHAPING AN ANTENNA PANEL

[75] Inventors: Prasad Kommineni, Melbourne, Fla.; Paul E. Hollandsworth, Roanoke, Va.; John W. Jones, Melbourne Beach, Fla.

[73] Assignee: Harris Corporation, Melbourne, Fla.

[21] Appl. No.: 885,515

[22] Filed: Jul. 14, 1986

[51] Int. Cl.$^4$ .............................................. B32B 31/20
[52] U.S. Cl. ..................... 156/245; 156/285; 156/382; 249/155; 264/554; 343/700 R; 343/912
[58] Field of Search ............ 156/245, 285, 382; 343/700 R, 912; 249/155; 264/511, 554, 571

[56] References Cited

U.S. PATENT DOCUMENTS

| | | | |
|---|---|---|---|
| 2,372,418 | 3/1945 | Forbes et al. | 49/67 |
| 2,410,888 | 11/1946 | Lucy | 249/155 |
| 2,969,544 | 1/1961 | Marco et al. | 343/912 |
| 3,004,295 | 10/1961 | Bottoms et al. | 264/554 |
| 3,254,342 | 5/1966 | Miller | 343/731 |
| 3,261,016 | 7/1966 | Burr | 343/100 |
| 3,897,294 | 7/1975 | MacTurk | 156/245 |
| 4,021,817 | 5/1977 | Shibano et al. | 343/912 |
| 4,574,457 | 3/1986 | Farnum | 156/382 |

FOREIGN PATENT DOCUMENTS 1425312  2/1976  United Kingdom ............... 249/155

*Primary Examiner*—Caleb Weston
*Attorney, Agent, or Firm*—John L. DeAngelis, Jr.

[57] ABSTRACT

An apparatus and method for forming an antenna reflector panel to a desired shape. The apparatus includes a plate having a plurality of threaded holes, wherein a threaded stud is located in each one of the plurality of threaded holes. The tops of the threaded studs define the desired antenna panel contour. Two metal sheets with a honeycomb structure between them are urged against the stud tops by enclosing the fixture and drawing a vacuum therein. After the metal sheets and honeycomb structure have been held in the desired contour for a predetermined time the vacuum is released. The sheet and honeycomb structure are now permanently deformed into the desired shape.

6 Claims, 2 Drawing Figures

METHOD OF SHAPING AN ANTENNA PANEL

FIELD OF THE INVENTION

This invention relates to a bonding fixture for the fabrication of antenna panels and a method of manufacturing antenna panels using the bonding fixture.

BACKGROUND OF THE INVENTION

To provide desired amplitude and phase characteristics, antenna reflectors are often shaped, i.e., the surface shape of the antenna is changed from a conic section (a parabola, a paraboloid, ellipse, ellipsoid, hyperbola, or hyperboloid) to a new curvature or shape. This shaping feature is used advantageously in a commonly-owned, co-pending patent application entitled, "*Compact Antenna Range Employing Shaped Reflectors*", Ser. No. 06/729,338, filed May 1, 1985. The shaping of antenna reflectors is also discussed in an article entitled, "*Minimum-Noise Maximum-Gain Telescopes and Realization Method For Shaped Asymmetric Surfaces,*" by Sebastian Von Hoerner, appearing in the IEEE Transactions on Antennas and Propagation, Volume AP-26, No. 3, May 1978, pages 464 through 471.

Shaped antenna panels, and in fact most antenna panels, are fabricated using a solid bonding fixture shaped to a particular panel shape. Because each panel in an antenna may have a different shape, a solid bonding fixture is needed for each such panel and thus several solid bonding fixtures are required to fabricate an antenna dish. The solid bonding fixture, a machined surface, is essentially a truss structure formed of beam-like members and shaped to produce the final desired panel shape. In a typical assembly operation, a flexible metal panel or skin is securely clamped to the bonding fixture. A honeycomb backup structure is glued to the metal skin and then a second metal panel or skin is glued to the exposed side of the honeycomb structure. Thus a sandwich is formed with honeycomb structure between two flexible sheets of metal. After having been clamped to the bonding fixture for a predetermined curing time, the metal sheets and the honeycomb structure are permanently deformed into the shape defined by the bonding fixture. The fabricated panel is then released from the bonding fixture, attached to a rigid frame, and arranged with other panels to form a complete antenna reflector surface.

Since the bonding fixture is a machined surface, its size and shape must be accurately fixed during a very expensive machining operation. A typical antenna will require five or six differently shaped panels and thus five or six differently shaped bonding fixtures are required. A large part of the antenna cost is devoted to the manufacture of these precision bonding fixtures and often the fixtures are not useable for other antenna reflectors because the shape of the panels depends on the size of the antenna dish and its desired amplitude and phase characteristics. In essence then, the bonding fixtures are custom made for each antenna.

In lieu of the metal-honeycomb-metal sandwich, an antenna panel can be formed by clamping a single metal sheet to the bonding fixture, and gluing a kerfed channel frame to the metal skin. The kerfed frame is a channel member with slits cut into it to make it flexible. After the glue has cured, the assembly is released from the bonding fixture. The skin, which was deformed by the clamps into the proper shape, is now held in that shape by the adhesion to the kerfed channel.

Another technique for fabricating antenna reflectors is disclosed in U.S. Pat. No. 4,021,817 entitled, "*Method of Manufacture of Antenna Reflector Having a Predetermined Curve Surface.*" This patent describes a technique for forming a complete antenna reflector in one step. The reflector is manufactured by grouping a plurality of die members onto a die base and selectively adjusting the height of each die member so that the assembly of die members defines a convex surface conforming to the desired concave surface of the reflector. The perimetrical edges of a metal or synthetic plastic are engaged by a press that forces the metal or plastic under pressure downwardly onto the die members, thereby forming the blank plastic or metal into an antenna reflector having the desired concave surface contour. A disadvantage associated with this invention is that the use of a press allows only concave surface contour reflectors to be made. Further, it is not clear how the adjustable dies are adjusted or how they are locked in place. It appears access to the adjustment and/or locking features must be made from beneath the die base. Lastly, the action of pressing the blank plastic or metal against the die members creates a dimple in the blank at each die member.

SUMMARY OF THE INVENTION

The present invention offers advantages over the prior art techniques discussed above including the use of dual threaded rods for adjusting the surface contour. A coarse adjustment is formed by a threaded screw in a threaded hole formed in a base plate. The coarse adjustment rod also has internal threads for insertion of a threaded fine-adjustment rod. Both the fine and coarse adjustment rods are locked in place with nuts. Use of the dual threaded rod arrangement allows access for adjustment to these rods from the top of the base plate before the metal skin is placed over the rods.

The antenna panels are formed by laying a blank plastic or metal sheet over the fine-adjustment rods, gluing a honeycomb structure to the metal sheet, and then gluing a second metal sheet to the exposed side of the honeycomb structure. The plate/rod assembly and the honeycomb structure are covered and a vacuum is drawn so that the honeycomb sandwich is formed into a shape defined by the tops of the adjustment rods. In lieu of the honeycomb structure, the antenna panel can be formed with a single metal skin and a kerfed channel glued thereto.

Use of the present invention reduces tooling costs significantly by allowing simple adjustment of the threaded rods to replace the complex and expensive task of machining new bonding fixtures for each antenna panel. Further, the accuracy of antenna panel contours is significantly increased using this invention. According to the aforementioned prior art U.S. Pat. No. 4,021,817, the attainable surface precision with that invention is ±0.5 mm (14 mils); the technique of the present invention provides accuracies of approximately 3 mils.

BRIEF DESCRIPTION OF THE DRAWINGS

The present invention can be more easily understood, and the further advantages and uses thereof more readily apparent, when considered in view of the description of the preferred embodiments and the following figures in which.

DESCRIPTION OF THE PREFERRED EMBODIMENTS

Figure 1:
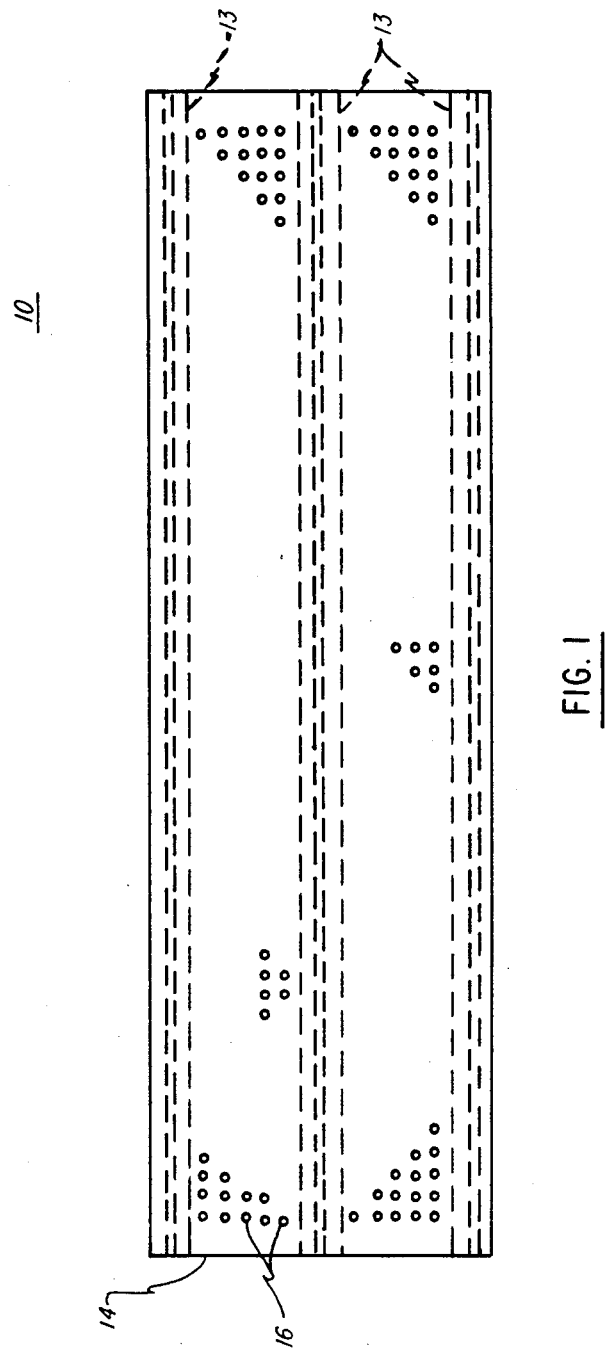
FIG. 1 is a plan view of the base plate of the present invention.
Figure 2:
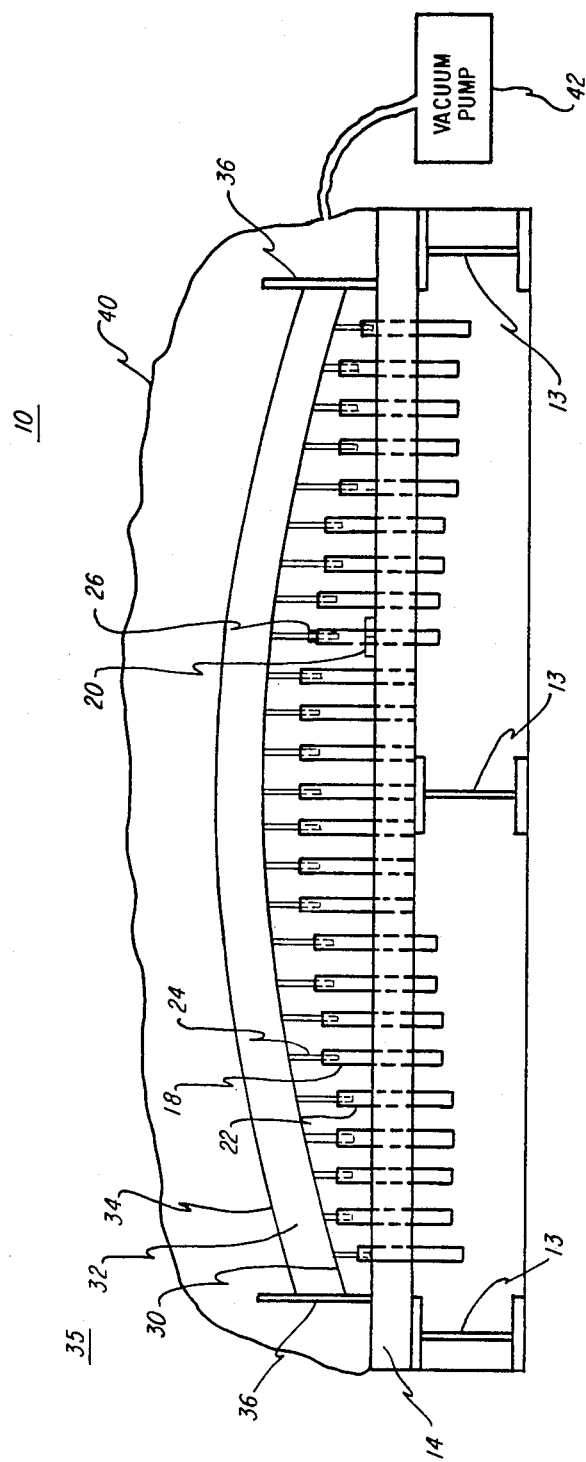
FIG. 2 is a cross-sectional view of the base plate shown in FIG. 1 with an antenna panel skin in position for forming.

FIGS. 1 and 2 illustrate an adjustable antenna bonding fixture 10 constructed according to the teachings of the present invention. The adjustable antenna bonding fixture 10 includes an I-beam frame 13 attached beneath a plate 14. The plate 14 includes a plurality of threaded holes 16, only a few of which are illustrated in FIG. 1.

Turning to FIG. 2, it can be seen that a coarse-adjustment stud 18 is inserted into each threaded hole 16. Each coarse-adjustment stud is held in place by a nut, one of which is illustrated in FIG. 2 and designated by the reference character 20. Each coarse-adjustment stud 18 also includes a threaded hole 22. A fine-adjustment stud 24 is located in each threaded hole 22. Each fine-adjustment stud 24 is held in place by a nut, one of which is shown in FIG. 2 and designated with reference character 26.

The tops of the fine-adjustment studs 24 represent the shape of the antenna panel to be fabricated. The fine adjustment studs 24 (and thus the coarse-adjustment studs 22) are spaced closely so that the tips of the former can represent any shape or curvature. Also, because both the coarse-adjustment studs 22 and the fine-adjustment studs 24 are adjustable, it is possible to make any shape and size antenna panel. One bonding fixture can then be used to make panels of any size and contour for any antenna dish reflector. If the tips of the fine-adjustment studs 24 are damaged or worn they can be replaced easily at minimal cost.

FIG. 2 shows a panel skin 30 on top of the tips of each fine-adjustment stud 24. A honeycomb material 32, well known in the construction of antenna panels, is glued to the panel skin 30 and a panel back skin 34. Hereinafter, the panel skin 30, the honeycomb material 32, and the panel back skin 34 will be referred to generally as the antenna panel 35. Prior to placing the antenna panel 35 on the adjustable antenna bonding fixture 10 the desired shape is determined for the antenna panel 35. Depending on the application, the shape can represent any of the well-known surfaces of revolution (hyperbola or parabola for example) or an unsymmetric shaped-surface.

The antenna panel 35 is divided into a grid system corresponding to the locations of the coarse and fine adjustment studs 22 and 24, respectively. The depth of these grid points on the antenna panel is then determined and transferred to the heights of corresponding coarse and fine adjustment studs 22 and 24 on the adjustable antenna bonding fixture 10. A computer program is used to convert antenna reflector shaping data into heights for the coarse and fine adjustment studs 22 and 24. The setting of the adjustment heights is done on a precision coordinate measurement machine that has a volumetric accuracy of 0.0005 inch bandwidth. The measuring probe on the coordinate measurement machine is positioned over the coarse and fine adjustment studs 22 and 24 at the correct height and then coarse and fine adjustment studs 22 and 24 are adjusted to that height and locked in place using the nuts 20 and 26. This process is repeated at the location of each of the coarse and fine adjustment studs 22 and 24 on the bonding fixture 10. The tops of the coarse and fine adjustment studs 22 and 24 will then form a smooth curve representing the desired shape for the antenna panel 35, and the bonding fixture 10 is then ready for panel fabrication. When a differently shaped panel is needed, the coarse and fine adjustment studs 22 and 24 are readjusted as described above and the new panel is fabricated. This process can be repeated any number of times to transform the bonding fixture 10 into the desired shape for any number of panel surfaces required for a particular antenna reflector. In one embodiment, the antenna panel 35 is held in position by sidestops 36 shown in FIG. 2.

After the correct contour has been established and the antenna panel 35 is in place, the adjustable antenna bonding fixture 10 is enclosed in a membrane or bag 40. The membrane 40 is connected to a vacuum pump 42 and a vacuum is drawn. The vacuum forces the antenna panel 35 firmly against the top of each fine-adjustment stud 24. The antenna panel is held in this vacuumed state for a predetermined number of hours dependent on the curing time of the adhesive. In one embodiment the period is twenty-four hours. The curing time is a function of temperature, i.e., curing time decreases as the curing temperature increases. At the end of this time the vacuum is released and the antenna panel 35 is permanently contoured to the shape defined by the tips of the fine-adjustment studs 24.

In one embodiment the threaded holes 16 are located at two inch intervals in the plate 14. The coarse-adjustment studs 18 are ½-13 nuts and the fine-adjustment studs 24 are 6–32 studs. In one embodiment, the panel skin 30 is constructed of aluminum with a thickness of 0.04 inches.

In another embodiment, instead of using the metal skin-honeycomb-metal skin for the antenna panel 35 as illustrated in FIG. 2, it is possible to use a single metal skin (either stretch formed or slit to achieve the necessary flexibility) and a kerfed frame bonded to the metal skin. In this embodiment surface accuracy of 0.005 rms inch has been obtained. The limiting factor is the number of frame members or stiffners needed to maintain the curvature after the adhesive has cured. The significant dimensional deviations in the antenna panel 35 are found to be between the frame members, thus this effect can be minimized by continuously supporting the skin. One technique for continuously supporting the skin is the metal skin-honeycomb-metal skin sandwich illustrated in FIG. 2. In this latter embodiment the metal skins and honeycomb are flexible and easily formable by the bonding fixture 10, but the bonded assembly is very stiff. The antenna panel stiffness is proportional to the product of the thickness of the metal skins 30 and 34 and the square of the distance between the metal skins 30 and 34 (i.e., the thickness of the honeycomb material 32).

In yet another embodiment, slits in a pattern that radiates from the center of the antenna panel 35, like the spokes of a wheel, are cut in the panel skin 30 before placement on the fine-adjustment studs 24. The slits provide additional flexibility so that when the vacuum is drawn by the vacuum pump 42 the panel skin 30 will closely adhere to the tips of the fine-adjustment studs 24. To close the gaps created by the slits, a second panel skin (not shown in the Figures) also having slits cut therein is placed between the studs 24 and the panel skin 30 with the slits in each of the panel skins offset. The honeycomb material 32 and the panel backup skin 34 are then put in place. The second panel skin is not part of the antenna panel 35, but is used to ensure that all of the studs 24 are used in shaping the antenna panel 35 and none slip through the slits cut in the panel skin 30.

Having now discussed the adjustable antenna bonding fixture 10 in detail, the advantages thereof are more easily apparent. As is well known, antenna reflector dishes consist of several panels assembled together in a predetermined pattern. When it is desired to use shaped panel reflectors, the attributes of the adjustable antenna panel bonding fixture 10 allow the shaped panels to be made at a substantial savings over the prior art custom machined bonding fixtures. Because a large part of the antenna cost is involved in making these custom bonding fixtures, use of the adjustable antenna bonding fixture 10 of the present invention provides substantial cost savings. Also the custom bonding fixtures suffer from wear and attendant inaccuracy after several hundred uses. This problem can be easily corrected with the adjustable antenna bonding fixture 10 by simply replacing the fine-adjustment studs 24. Since the adjustable antenna bonding fixture 10 is easily adjustable, it can be readily configured to accommodate different antenna panel shapes, i.e., the adjustable bonding fixture 10 is infinitely adjustable. The vacuum technique is advantageous in that the antenna panel is uniformly drawn against the tops of the adjustable fine studs 24. If a clamp-type structure was used, small dents would appear in the antenna panel at the clamp locations. Antennas using the adjustable bonding fixture 10 have been constructed to an accuracy of 3 mils, which is far better than the prior art techniques.

In yet another embodiment it is possible to use single adjustable studs, rather than the dual coarse-adjustment studs 18 and the fine-adjustment studs 24 as shown in FIG. 2. Such a single adjustable stud would have a matching nut for rigidly holding the stud in place after the proper contour has been established.

In still another embodiment of the present invention, the adjustable antenna bonding fixture 10 is used to form a fiberglass-reflector. The reflector is formed by several successive layers of cloth and fiberglass placed over the adjustable antenna bonding fixture 10. Hardening of the fiberglass produces a rigid structure, which can be accurately shaped by polishing or filling imperfections as required. The reflector is then flame sprayed with a metallic substance to produce a reflective surface. Alternatively, by setting the coarse and fine adjustment studs 22 and 24 in a concave (or reverse) configuration a fiberglass mold can be made. Mold imperfections can be removed by polishing or filling as required, then the reflector panels are formed by clamping either the honeycomb sandwich or the metal skin with a kerfed frame to the mold. Curing of the honeycomb or kerfed channel adhesive permanently deforms the panel into the proper shape.

Although we have shown and described an embodiment in accordance with the present invention, it is understood that the present invention is not limited thereto but is susceptible of numerous changes and modifications as known to a person skilled in the art. We therefore, do not wish to be limited to the details shown and described herein, but intend to cover all such changes and modifications as are obvious to one of ordinary skill in the art.

What is claimed is:

1. A method for shaping an antenna panel including the steps of:

adjusting a plurality of threaded studs located in a base member so that the tops of said plurality of threaded studs define a desired antenna panel contour;

placing a front-side sheet material on top of said plurality of threaded studs;

bonding a honeycomb structure to said front-side sheet material using an adhesive;

bonding a back-side sheet material to the exposed side of said honeycomb structure;

enclosing said plurality of threaded studs, said base member, said honeycomb structure, and said front-side and said back-side sheet materials in an enclosure;

drawing a vacuum within said enclosure so that said front-side sheet material is urged against the tops of said plurality of threaded studs, wherein said front-side and said back-side sheet materials are deformed into the shape defined by the tops of said plurality of threaded studs, and wherein when said adhesive cures said front-side and said back-side sheet materials hold the shape defined by the tops of said plurality of threaded studs;

releasing said vacuum after a predetermined time.

2. A method for fabricating an antenna panel to a desired shape, including the steps of:

adjusting a plurality of threaded studs located in a base member so that the tops of said plurality of threaded studs define a desired antenna panel contour;

placing a plurality of curable layers on top of said plurality of threaded studs;

curing said plurality of curable layers;

rendering the appropriate surface of said plurality of curable layers reflective such that said plurality of curable layers represent an antenna panel.

3. A method for shaping an antenna panel including the steps of:

adjusting a plurality of threaded studs located in a base member so that the tops of said plurality of threaded studs define a desired antenna panel contour;

placing a first sheet material on top of said plurality of threaded studs, wherein said first sheet material has a plurality of slits cut therein;

placing a second sheet material atop said first sheet material, wherein said second sheet material has a plurality of slits cut therein;

wherein said plurality of slits in said first sheet material are offset from said plurality of slits in said second sheet material;

bonding a honeycomb structure to said second sheet material using an adhesive;

bonding a third sheet material to the exposed side of said honeycomb structure using an adhesive;

enclosing said plurality of threaded studs, said base member, said honeycomb structure, and said first, said second, and said third sheet materials in an enclosure;

drawing a vacuum within said enclosure so that said first sheet material is urged against the top of said plurality of threaded studs, wherein said first, said second, and said third sheet materials are deformed into the shape defined by the tops of said plurality of threaded studs, and wherein when said adhesive cures said second, and said third sheet materials hold the shape define by the tops of said plurality of threaded studs;

releasing said vacuum after a predetermined time.

4. The method of claim 3 wherein the plurality of slits in the first sheet material form a spoke-like pattern radiating from the center of the first sheet material;
wherein the plurality of slits in the second sheet material form a spoke-like pattern radiating from the center of the second sheet material.

5. A method for shaping an antenna panel including the steps of:
adjusting a plurality of threaded studs located in a base member so that the tops of said plurality of threaded studs define a desired antenna panel contour;
placing a first sheet material on top of said plurality of threaded studs, wherein said first sheet material has a plurality of slits cut therein;
placing a second sheet material on top of said first sheet material, wherein said second sheet material has a plurality of slits cut therein;
bonding a kerfed channel member to the back-side of said second sheet material using an adhesive;
enclosing said plurality of threaded studs, said base member, said kerfed channel member, and said first and said second, sheet materials in an enclosure;
drawing a vacuum within said enclosure so that said first sheet material is urged against the tops of said plurality of threaded studs, wherein said first and said second sheet materials are deformed into the shape defined by the tops of said plurality of threaded studs, and wherein when said adhesive cures said second sheet material holds the shape defined by the tops of said plurality of threaded studs;
releasing said vacuum after a predetermined time.

6. The method of claim 5 wherein the plurality of slits in the first sheet material form a spoke-like pattern radiating from the center of said first sheet material.

* * * * *